(12) United States Patent
Hensley (10) Patent No.: US 11,073,287 B2
(45) Date of Patent: Jul. 27, 2021

(54) COOKING APPLIANCE AND METHOD FOR DETERMINING A FUEL OR ELECTRICAL INPUT INTO A COOKING APPLIANCE

(71) Applicant: Haier US Appliance Solutions, Inc., Wilmington, DE (US)

(72) Inventor: Amelia Lear Hensley, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 304 days.

(21) Appl. No.: 16/111,289

(22) Filed: Aug. 24, 2018

(65) Prior Publication Data

US 2020/0063973 A1   Feb. 27, 2020

(51) Int. Cl.
*F24C 7/08* (2006.01)
*G01N 25/20* (2006.01)

(52) U.S. Cl.
CPC ............. *F24C 7/081* (2013.01); *G01N 25/20* (2013.01)

(58) Field of Classification Search
CPC .......... F24C 3/008; F24C 7/081; F24C 7/082; G01N 25/20
USPC ................ 219/494, 497, 506, 412–414, 483; 251/206, 207, 208, 209, 286, 287; 126/39 E See application file for complete search history.

(56) References Cited

U.S. PATENT DOCUMENTS

| 4,845,341 | A  | * | 7/1989  | Rae ..................... A47J 37/1266 219/497 |
| 5,293,019 | A  | * | 3/1994  | Lee ........................... A23L 3/01 219/708 |
| 5,990,460 | A  |   | 11/1999 | Petty et al. |
| 6,150,637 | A  | * | 11/2000 | Arroubi ................. H05B 6/687 219/413 |
| 6,841,761 | B1 |   | 1/2005  | Banzato et al. |
| 8,102,080 | B2 |   | 1/2012  | Fonseca et al. |
| 2005/0016990 | A1 | * | 1/2005  | Wilkins .................. H05B 3/746 219/494 |
| 2015/0282251 | A1 | * | 10/2015 | Meusburger ............ F24C 3/124 219/494 |
| 2016/0051078 | A1 | * | 2/2016  | Jenkins ...................... F24C 3/12 99/331 |
| 2018/0152995 | A1 | * | 5/2018  | Noda ................... H05B 6/6444 |

\* cited by examiner

*Primary Examiner* — Dana Ross
*Assistant Examiner* — Ket D Dang
(74) *Attorney, Agent, or Firm* — Dority & Manning, P.A.

(57) ABSTRACT

A method and system are provided or determining a fuel or gas type input into a fuel system or a voltage input into an electrical system of a cooking appliance. For instance, the cooking appliance may be a cooktop appliance or an oven appliance. Particularly, a calibration cycle may be performed in which the heating rate of an object or air at or within the cooking appliance is determined. Based on the determined heating rate, the input may be classified. That is, based on the heating rate, the gas type or input voltage into the cooking appliance may be determined. Further, based on the classified input, the settings of the cooking appliance may be selected for optimal cooking performance.

13 Claims, 6 Drawing Sheets

FIG. 9

COOKING APPLIANCE AND METHOD FOR DETERMINING A FUEL OR ELECTRICAL INPUT INTO A COOKING APPLIANCE

FIELD OF THE INVENTION

The subject matter of the present disclosure relates generally to cooking appliances. More particularly, the subject matter of the present disclosure relates generally to cooking appliances and methods for determining a fuel or electrical input into a cooking appliance.

BACKGROUND OF THE INVENTION

Cooking appliances, such as e.g., cooktop and oven appliances, typically include one or more heating elements for heating cooking utensils and food items disposed therein. For instance, a cooktop appliance may include a plurality of gas burners or electric heating elements. An oven appliance may similarly include one or more gas burners or electric heating elements. Accordingly, cooking appliances may have a fuel system for delivering fuel of gas to the gas burners or may have an electrical system for providing electrical power to the electric heating elements.

In some instances, cooking appliances are installed with settings that yield suboptimal cooking performance. For instance, for a cooking appliance with an electrical system, if the cooking appliance is designed for operation with a line voltage of 240V, but the actual line voltage input into the cooking appliance is only 208V, the difference in line voltage will have a negative impact on the cooking performance of the cooking appliance with respect to preset cooking profiles. Similarly, for a cooking appliance with a fuel or gas system, if the cooking appliance is designed for operation with natural gas (NG), but the fuel type input into the cooking appliance is liquefied petroleum (LP), the difference in fuel type could have a negative impact on the cooking performance of the cooking appliance. Conventionally, operators have had to manually determine the fuel type or supplied line voltage input into the cooking appliance, which may be inconvenient and may lead to user error. Further, attempts have been made to automatically determine the supplied line voltage. However, such systems require additional circuitry and components, thus leading to increased cost.

Accordingly, a cooking appliance and methods therefore that address one or more of the challenges noted above would be useful. Particularly, a cooking appliance and method for calibrating the cooking appliance to detect the gas type or supplied line voltage input into the cooking appliance would be beneficial. In this way, settings may be selected for optimal cooking performance.

BRIEF DESCRIPTION OF THE INVENTION

Aspects and advantages of the invention will be set forth in part in the following description, or may be apparent from the description, or may be learned through practice of the invention.

In one exemplary embodiment, a method for calibrating a cooking appliance is provided. The method includes providing an input to a heating element of the cooking appliance to generate heat at or within the cooking appliance. The method also includes receiving a plurality of signals indicative of a temperature of an object or air at or within the cooking appliance. Further, the method includes determining a heating rate of the object or air at or within the cooking appliance for a predetermined operating range based at least in part on the plurality of signals. The method also includes classifying the input into one classification of a plurality of classifications based at least in part on the heating rate determined. In addition, the method includes selecting one or more settings of the cooking appliance based at least in part on the classification of the input.

In another exemplary embodiment, a cooking appliance is provided. The cooking appliance includes a heating element. The cooking appliance also includes a controller communicatively coupled with a temperature sensor positioned within the cooking appliance or proximate the heating element. The controller is configured to: activate, via an input, the heating element to generate heat at or within the cooking appliance; receive a plurality of signals from the temperature sensor that are indicative of a temperature of an object or air at or within the cooking appliance; determine a heating rate of the object or air at or within the cooking appliance for a predetermined operating range based at least in part on the plurality of signals; classify the input into one classification of a plurality of classifications based at least in part on the heating rate determined; and select one or more settings of the cooking appliance based at least in part on the classification of the input.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents. As used herein, terms of approximation, such as "approximately," "substantially," or "about," refer to being within a ten percent (10%) margin of error.

Figure 1:
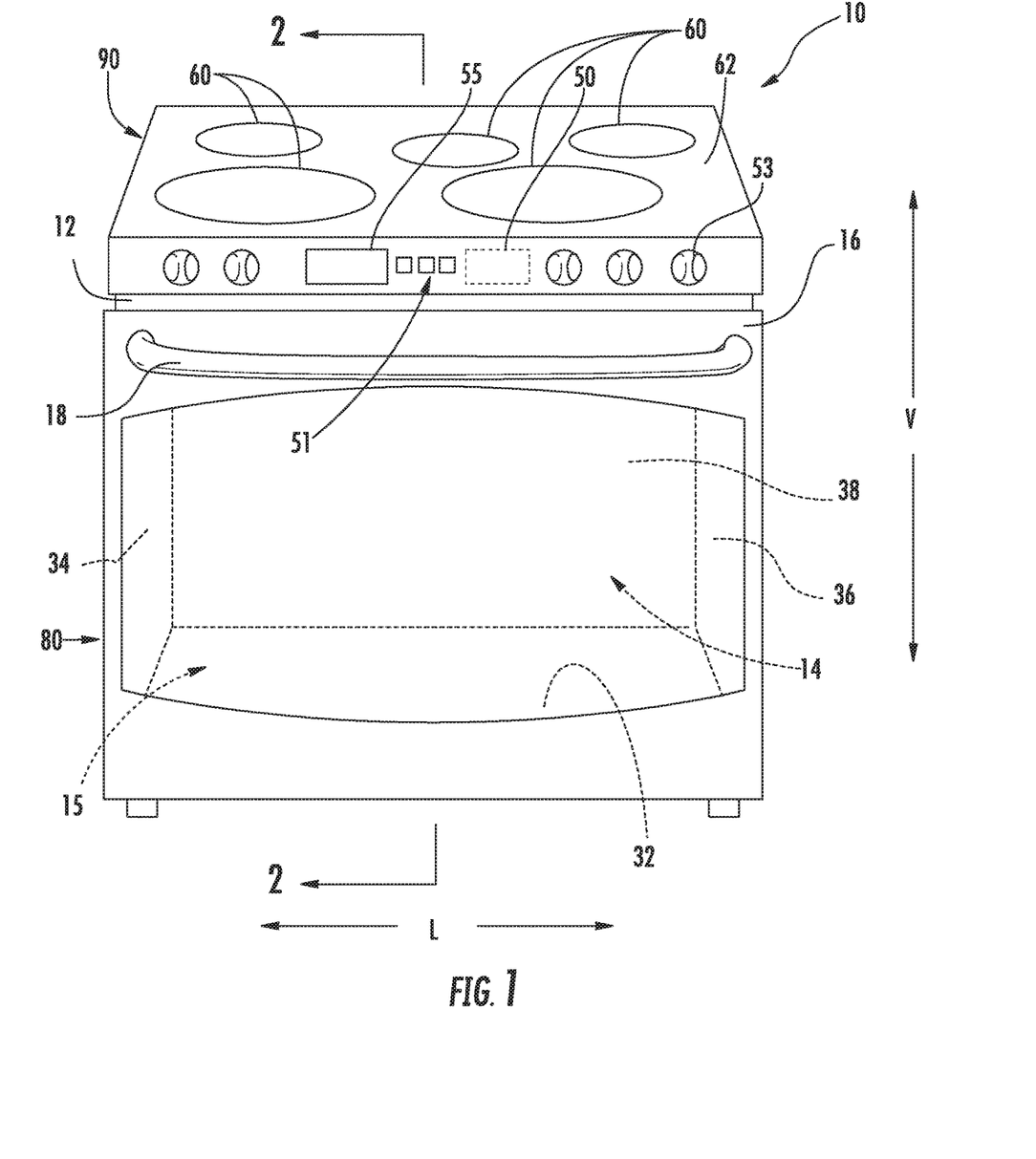
FIG. 1 provides a front perspective view of a cooking appliance according to example embodiments of the present disclosure.
Figure 2:
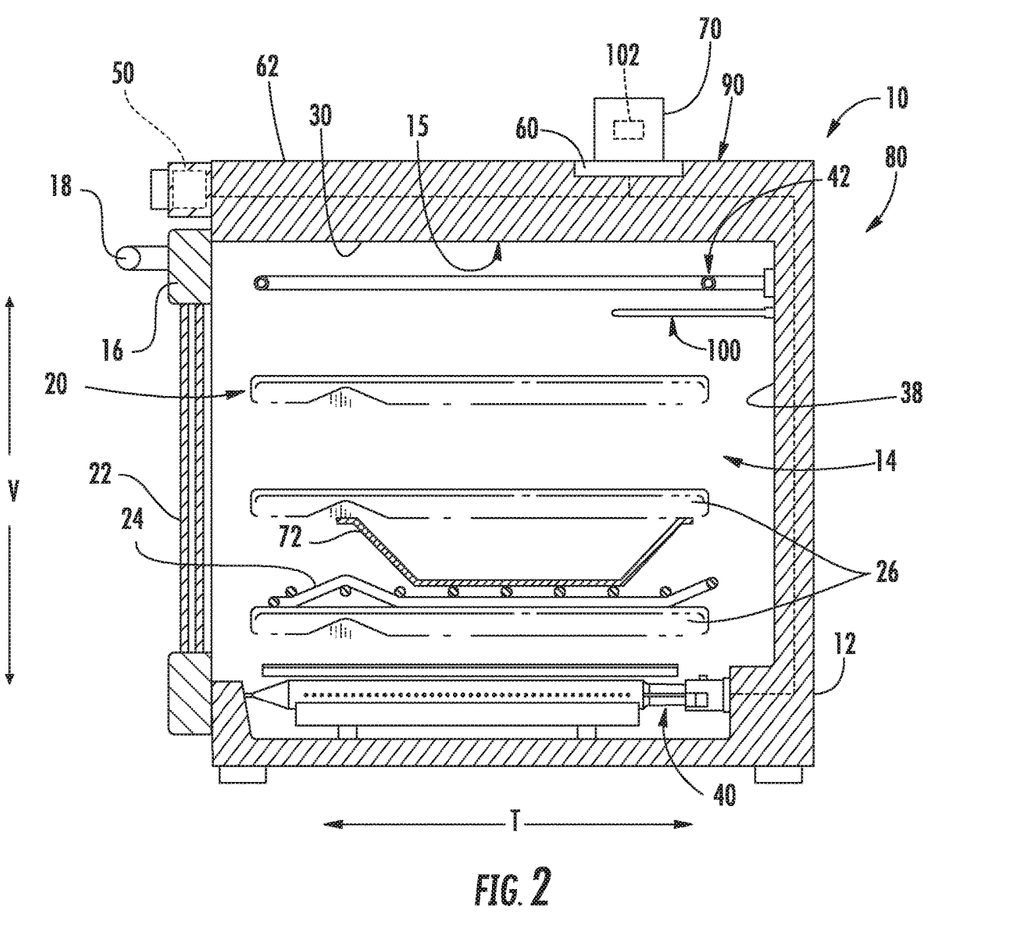
FIG. 2 provides a cross-sectional view of the example cooking appliance of FIG. 1 taken along the line 2-2 of FIG. 1.

FIGS. 1 and 2 provide views of an exemplary cooking appliance 10. In particular, FIG. 1 provides a front perspective view of cooking appliance 10 and FIG. 2 provides a side cross-sectional view of cooking appliance 10 taken along line 2-2 of FIG. 1. As shown, cooking appliance 10 defines a vertical direction V, a lateral direction L (FIG. 1), and a transverse direction T (FIG. 2). The vertical direction V, lateral direction L, and transverse direction T are mutually perpendicular and form an orthogonal direction system.

For the depicted embodiment of FIGS. 1 and 2, cooking appliance 10 includes an oven appliance 80 and a cooktop appliance 90. Thus, cooking appliance 10 may be referred to as an oven range appliance. However, the teachings and inventive aspects of the present disclosure may apply to any suitable cooking appliance. For instance, in some embodiments, the cooking appliance may be a standalone cooktop appliance, a standalone oven appliance, or some other cooking appliance. In addition, cooking appliance 10 is provided by way of example only. Thus, the example embodiments illustrated in the figures and describer herein are not intended to limit the present subject matter to any particular cooking appliance configuration, except as otherwise indicated.

Cooking appliance 10 includes an insulated cabinet 12 that defines an oven cavity or cooking chamber 14 of oven appliance 80. More particularly, cooking chamber 14 is defined by various interior surfaces 15 of cabinet 12. Cooking chamber 14 is configured for the receipt of one or more food items to be cooked. Cooking appliance 10 includes a door 16 rotatably mounted to cabinet 12, e.g., with a hinge (not shown). A handle 18 is mounted to door 16 and assists a user with opening and closing door 16 in order to access opening 20 (FIG. 2) to cooking chamber 14. For example, a user can pull on handle 18 to open or close door 16 and access cooking chamber 14 through opening 20.

Cooking appliance 10 can include one or more seals (not shown) between door 16 and cabinet 12 that assist with maintaining heat and cooking fumes within cooking chamber 14 when door 16 is closed as shown in FIG. 2. Multiple parallel glass panes 22 provide for viewing the contents of cooking chamber 14 when door 16 is closed and assist with insulating cooking chamber 14. A baking rack 24 is positioned in cooking chamber 14 for the receipt of one or more food items and/or utensils (e.g., utensil 72). Baking rack 24 is slidably received onto embossed ribs 26 or sliding rails such that rack 24 may be conveniently moved into and out of cooking chamber 14 when door 16 is open.

As shown, various sidewalls of cabinet 12 define cooking chamber 14. For this embodiment, cooking chamber 14 includes a top wall 30 (FIG. 2) and a bottom wall 32 (FIG. 1) which are spaced apart along the vertical direction V. Left sidewall 34 and right sidewall 36 (as defined according to a front view as shown in FIG. 1) extend between and connect top wall 30 and bottom wall 32 and are spaced apart along the lateral direction L. A rear wall 38 extends between top wall 30 and bottom wall 32 as well as between the left sidewall 34 and right sidewall 36, and is spaced apart from door 16 along the transverse direction T. Cooking chamber 14 is thus defined between the top wall 30, bottom wall 32, left sidewall 34, right sidewall 36, and rear wall 38.

In some embodiments, a gas fueled or electric bottom heating element 40 (e.g., a gas burner or an electric heating element) is positioned in cabinet 12, e.g., at a bottom portion of cabinet 12. Bottom heating element 40 may be used to heat cooking chamber 14 for both cooking and cleaning of cooking appliance 10. The size and heat output of bottom heating element 40 can be selected based on the e.g., the size of cooking appliance 10. Moreover, for this embodiment, oven appliance 80 includes a top heating element 42 positioned in cooking chamber 14 of cabinet 12, e.g., at a top portion of cabinet 12. Top heating element 42 is used to heat cooking chamber 14 for both cooking/broiling and cleaning of cooking appliance 10. Like bottom heating element 40, the size and heat output of top heating element 42 can be selected based on e.g., the size of cooking appliance 10. In the example embodiment shown in FIG. 2, top heating element 42 is shown as an electric resistance heating element. However, in alternative embodiments, a gas, microwave, halogen, or any other suitable heating element may be used instead of electric resistance heating element 42.

Cooking appliance 10 also includes a controller 50, e.g., configured to control one or more operations of cooking appliance 10. For example, controller 50 may control at least one operation of cooking appliance 10 that includes one or more of heating elements 40 and 42. Controller 50 is communicatively coupled (via a suitable wired or wireless connection) with a number of components of cooking appliance 10, including heating element 40, heating element 42, various components of a user interface panel 51 (FIG. 1), one or more heating elements 60 of cooktop appliance 90, a temperature sensing device 100 (FIG. 2) of oven appliance 80 (which is an RTD sensor), and other suitable components of cooking appliance 10. In some embodiments, controller 50 may be communicatively coupled with a wireless temperature sensor 102 embedded within a utensil, such as e.g., a pan 70 placed on one of the heating elements 60 of cooktop appliance 90. Thus, temperature sensor 102 is positioned proximate heating element 60. In general, controller 50 is operable to configure cooking appliance 10 (and various components thereof) for cooking, and in some instances, during installation and calibration cycles. Such configuration may be based, for instance, on a plurality of selected operating cycles or modes, e.g., as selected at user interface panel 51.

By way of example, controller 50 may include one or more memory devices and one or more microprocessors, such as general or special purpose microprocessors operable to execute programming instructions or micro-control code associated with an operating cycle. The memory device (i.e., memory) may represent random access memory such as DRAM, or read only memory such as ROM or FLASH. In one embodiment, the processor executes programming instructions stored in memory. The memory may be a separate component from the processor or may be included onboard within the processor. The memory can store information accessible to processing device, including instructions that can be executed by processing device. Optionally, the instructions can be software or any set of instructions that, when executed by the processing device, cause the processing device to perform operations. For certain embodiments, the instructions include a software package configured to operate appliance 10 and interpret one or more electrical signals. For example, the instructions may include a software package configured to execute commands based on feedback from a probe and antenna device as described more fully below.

Controller 50 may be positioned in a variety of locations throughout cooking appliance 10. As illustrated, controller 50 may be located within user interface panel 51 of cooking appliance 10 as shown in FIGS. 1 through 2. In such embodiments, input/output ("I/O") signals may be routed between controller 50 and various operational components of cooking appliance 10, such as heating element 40 and heating element 42 of oven appliance 80, controls 53, display component 55, heating elements 60 of cooktop appliance 90, temperature sensors 100, 102, alarms, and/or other components as may be provided. For instance, signals may be directed along one or more wiring harnesses that may be routed through cabinet 12.

In some embodiments, user interface panel 51 includes input components or controls 53, such as one or more of a variety of electrical, mechanical or electro-mechanical input devices. Controls 53 may include rotary dials, push buttons, and touch pads. Controller 50 is in communication with user interface panel 51 and controls 53 through which a user may select various operational features and modes and monitor progress of cooking appliance 10. In additional or alternative embodiments, user interface panel 51 includes display component 55, such as a digital or analog display in communication with controller 50 and configured to provide operational feedback to a user. In certain embodiments, user interface panel 51 represents a general purpose I/O ("GPIO") device or functional block.

Cooktop appliance 90 includes a cooktop surface 62 having one or more heating elements 60 for use in, for example, heating or cooking operations. In some embodiments, cooktop surface 62 is constructed with ceramic glass. In other embodiments, however, cooktop surface 62 may be formed of another suitable material, such as a metallic material (e.g., steel) or another suitable non-metallic material. Heating elements 60 may be various sizes and may employ any suitable method for heating or cooking an object, such as a cooking utensil or pan 70 (FIG. 2), and its contents. In some embodiments, for example, heating element 60 uses a heat transfer method, such as e.g., electric resistance coils or gas burners, to heat pan 70. In other embodiments, however, heating elements 60 use an induction heating method to heat the cooking utensil directly. Accordingly, heating elements 60 may include a gas burner element, resistive heat element, radiant heat element, induction element, or another suitable heating element.

During installation of cooking appliance 10, the oven and cooktop cycles and settings are typically set such that they optimized for the most common heating systems. For cooking appliances that utilize electrical power for powering their heating elements, the cycles and settings are set to correspond to a typical nominal line voltage, such as e.g., 208V or 240V. However, the actual voltage can vary from the nominal line voltage. The performance of a cooking appliance can be negatively influenced by the deviations in the line voltage input into the cooking appliance. For example, if a cooking range is designed for operation with a line voltage of 240V, but is used in an area where the line voltage is 230V, the difference in line voltage will have a negative impact on the cooking performance of the cooking range with respect to pre-set cooking profiles. Similarly, for cooking appliances that utilize fuel or gas for powering their heating elements, the cycles and settings are set to correspond to a typical gas source or type, such as e.g., natural gas (NG) (e.g., methane). The performance of a cooking appliance can be negatively influenced by the deviations in the gas type. For example, if a cooking range is designed for operation with NG, but liquefied petroleum (LP) (e.g., propane) is used instead, the difference in the gas type could have a negative impact on the cooking performance of the cooking range with respect to preset cooking profiles. Accordingly, in accordance with exemplary aspects of the present disclosure, systems and methods for determining the cooking appliance's electrical or fuel system are provided. That is, the systems and methods provided herein provide a means for determining the fuel or gas type input into the fuel system of the cooking appliance or the supplied line input voltage input into the electrical system of the cooking appliance. If the electrical or fuel system can be determined, operation of the cooking appliance can be optimized for that appliance's specific installation. Particularly, determining a cooking appliance's installation electrical or fuel system can be useful for multiple reasons. For instance, the detected system can be used to select or adjust settings such that the cooking appliance's operation is optimized for its installation, to provide a basis for error checking, and to provide a more accurate representation of installation conditions to the manufacturer. An exemplary method for calibrating a cooking appliance is provided below.

Figure 3:
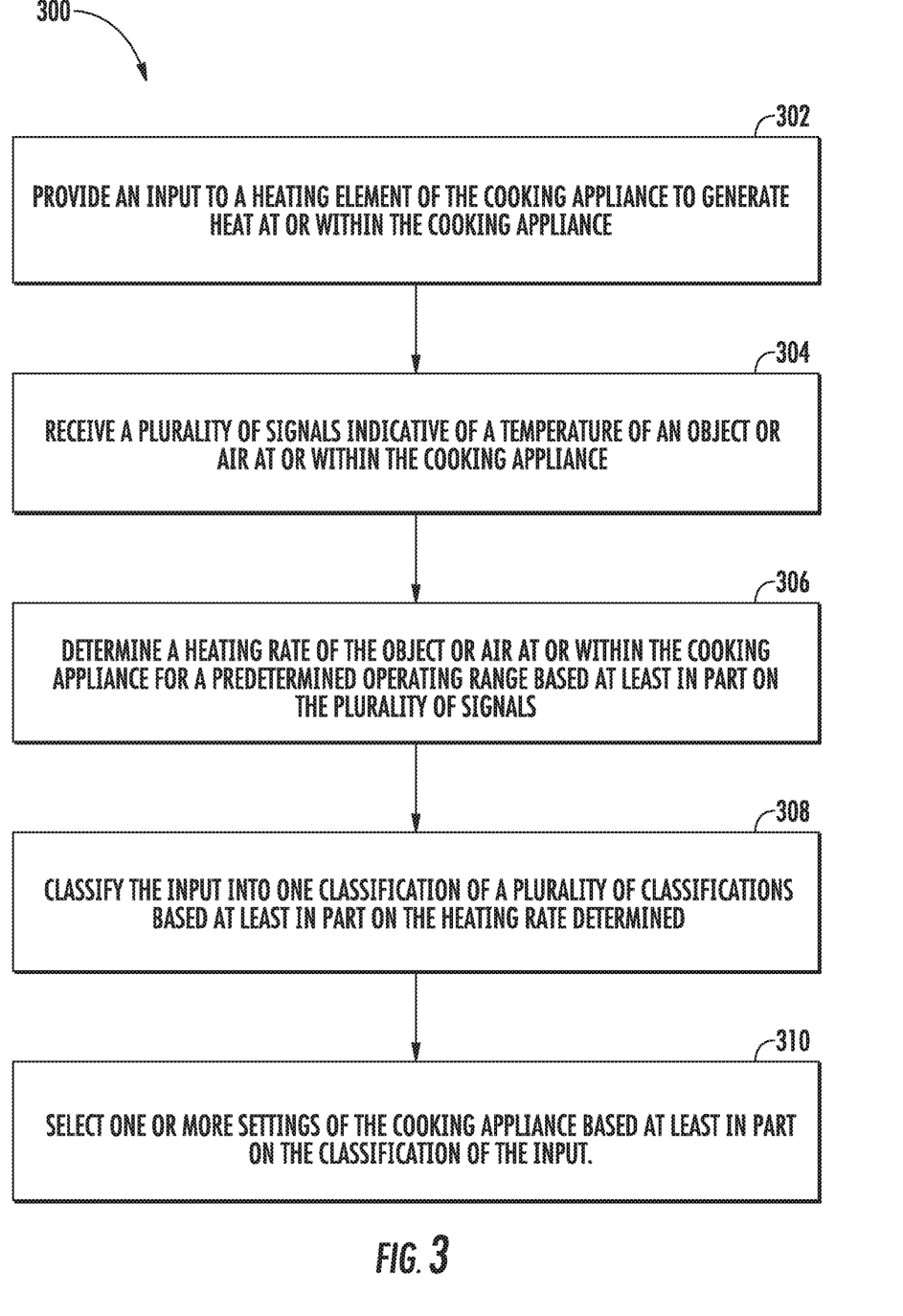
FIG. 3 provides a flow diagram for an exemplary method according to example embodiments of the present disclosure.

FIG. 3 provides a flow diagram for an exemplary method (300) for calibrating a cooking appliance according to example embodiments of the present disclosure. For instance, the cooking appliance may be cooking appliance 10 described above and illustrated in FIGS. 1 and 2. For context, reference numerals used to denote certain features of cooking appliance 10 illustrated in FIGS. 1 and 2 and described in the accompany text will be utilized below. However, as will be appreciated, method (300) is applicable to other suitable cooking appliances, such as e.g., a standalone cooktop appliance, a standalone oven appliance, etc.

At (302), the method (300) includes providing an input to a heating element of the cooking appliance to generate heat at or within the cooking appliance. Stated another way, the calibration cycle is commenced by activating one or more heating elements of the cooking appliance such that heat is generated at, e.g., a heating element of a cooktop appliance, or within the cooking appliance, e.g., within a cooking chamber of an oven appliance. As noted above, the cooking appliance may be the cooking appliance 10 of FIGS. 1 and 2, which as noted previously, includes oven appliance 80 and cooktop appliance 90. The heating element may be one of the heating elements 40, 42 of oven appliance 80 or one of the heating elements 60 of cooktop appliance 90. Both oven appliance 80 and cooktop appliance 90 may be calibrated utilizing method (300). That is, one or more settings of oven appliance 80 and/or cooktop appliance 90 may be selected or adjusted based upon the input received during the calibration cycle. In some implementations, controller 50 is configured to activate, via the input, the heating element to generate heat at or within the cooking appliance. As noted below, the input may be a gas or fuel input or an electric input.

In some implementations, the cooking appliance 10 may have a fuel system for generating heat for cooking. In such implementations, the input is a gas input. That is, gas is provided to one of the heating elements 40, 42, 60 of the cooking appliance 10 so that heat may be generated. One or all of the heating elements 40, 42, 60 may be gas burners. The gas may be any suitable type of gas. For instance, the gas may be a liquefied petroleum (LP) or natural gas (NG). The type of gas determined or detected during the calibration cycle may be utilized to select or adjust the settings of the cooking appliance.

In yet other implementations, the cooking appliance 10 may have an electrical system for generating heat for cooking. In such implementations, the input is a voltage input. That is, electrical power is provided to one of the heating elements 40, 42, 60 of the cooking appliance 10 so that heat may be generated. One or all of the heating elements 40, 42, 60 may be electric resistance, induction, or some other type of electrical heating elements. The supplied voltage input may be any suitable voltage. For instance, the voltage input may be 208V, 220V, 230V, 240V, etc. The voltage input determined or detected during the calibration cycle may be utilized to select or adjust the settings of the cooking appliance.

At (304), the method (300) includes receiving a plurality of signals indicative of a temperature of an object or air at or within the cooking appliance. For instance, controller 50 of cooking appliance 10 may receive a plurality of signals indicative of a temperature of an object or air at or within cooking appliance 10. As noted, the signals may be indicative of a temperature of an object, such as e.g., pan 70 of FIG. 2 that has temperature sensor 102 embedded within a sidewall or base of pan 70. As heat is generated by heating element 60 at (302), temperature sensor 102 embedded within pan 70 senses the temperature of pan 70. The plurality of signals may be routed to controller 50 by a suitable communication link, such as e.g., a wireless or wired communication line. The temperature sensor 102 may sense the temperature continuously, at a predetermined interval (e.g., every second), or when specifically directed to do so, e.g. by a command signal sent from controller 50. The signals may be output by temperature sensor 102 in any suitable fashion, such as e.g., as a voltage output.

Further, in some implementations, the signals may be indicative of a temperature of the air at or within cooking appliance 10. For example, as heat is generated by one of heating elements 40, 42 at (302), temperature sensor 100 disposed within cooking chamber 14 senses the temperature of the air within cooking chamber 14. The plurality of signals may be routed to controller 50 in any suitable manner, as noted above. It will be appreciated that the sensor configured to sense the temperature of an object or the air at or within cooking appliance 10 may be positioned in other suitable locations as well. Although the temperature sensor may be the RTD temperature sensor 100 mounted to cabinet 12 or a wireless temperature sensor 102 embedded within pan 70 that is positioned on heating element 60 of cooktop appliance 90, it will be appreciated that other suitable sensors may be used. For instance, the temperature sensor for oven appliance 80 may be embedded within a cookware, e.g., within cooking utensil 72, the sensor may be external to the cookware but yet attached thereto, the sensor may be a meat probe, etc. For cooktop appliance 90, the sensor may be a cookware with an embedded sensor (e.g., temperature sensor 102), the sensor may be embedded within a grate, or may be embedded within cooktop surface 62 (e.g., within the glass of a glass cooktop surface). Moreover, in some implementations, upon receiving the plurality of signals from the temperature sensor, controller 50 may filter the signals.

At (306), the method (300) includes determining a heating rate of the object or air at or within the cooking appliance for a predetermined operating range based at least in part on the plurality of signals. The heating rate is indicative of a change in the temperature of the object or air at or within the cooking appliance over time for the predetermined operating range.

Figure 4:
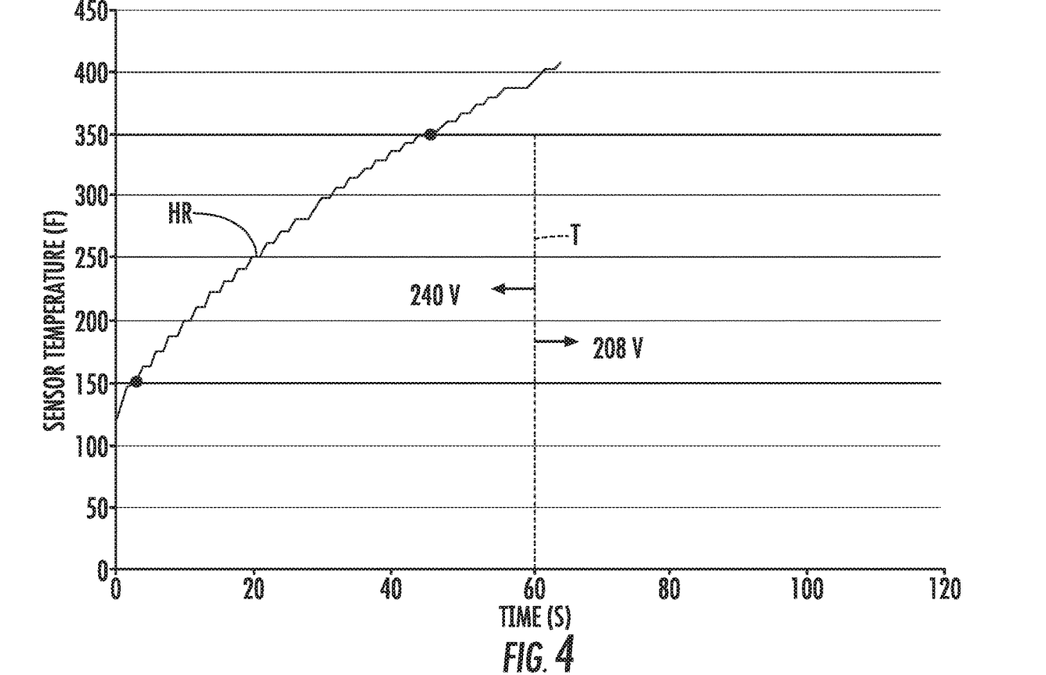
FIG. 4 provides a graph depicting a heating rate of an object at the cooking appliance and depicts the heating rate compared to a threshold according to example embodiments of the present disclosure.

FIG. 4 provides a graph depicting a heating rate of an object at the cooking appliance according to example embodiments of the present disclosure. For this example, the cooking appliance has an electrical system. Thus, the input is a voltage input. The Y-axis of the graph depicts temperature of the object at or within the cooking appliance and the X-axis of the graph depicts time. Moreover, for this example, the predetermined operating range is selected as a range between one hundred fifty degrees and three hundred fifty degrees Fahrenheit (150-350° F.). In other examples, the predetermined operating range may have a different temperature range, which may be based on e.g., the type of cooking appliance and the type of heating system of the cooking appliance, among other factors. As shown in FIG. 4, the plurality of signals received from the temperature senor are plotted or tracked as a function of time to determine the heating rate of the object at or within the cooking appliance. The plotted heating rate is denoted by HR in FIG. 4. The time period in which the temperature of the object is plotted as a function of time extends between a time in which the temperature reaches one hundred fifty degrees Fahrenheit (150° F.) and a time in which the temperature reaches three hundred fifty degrees Fahrenheit (350° F.). In this example, the heating rate is plotted for about forty (40) seconds, or the time it takes the cooking appliance to heat from one hundred fifty degrees to three hundred fifty degrees Fahrenheit (150-350° F.).

At (308), returning to FIG. 3, the method (300) includes classifying the input into one classification of a plurality of classifications based at least in part on the heating rate determined. For instance, in implementations in which the cooking appliance has a fuel system for generating heat for cooking, the classifications are representative of different gas types. For instance, the gas types may include, LP, NG, and other gas types. In implementations in which the cooking appliance has an electrical system for generating heat for cooking, the classifications are representative of different line voltages or values. For instance, the line voltage values may include, 208V, 220V, 230V, 240V, as well as others.

Moreover, in some implementations, classifying the input into one classification of the plurality of classifications based at least in part on the heating rate determined includes determining whether the heating rate exceeds a threshold. Referring again to FIG. 4, as shown, after the heating rate HR is determined at (306), the input is classified by determining whether the heating rate HR exceeds a threshold, denoted as "T" in FIG. 4. Particularly, in this example, the heating rate HR is compared to threshold T that is set at about sixty (60) seconds from the point in time in which the temperature sensor reads one hundred fifty degrees Fahrenheit (150° F.). Moreover, for this example, controller 50 is configured to distinguish between voltage inputs of 240V and 208V. Threshold T distinguishes the 240V and 208V classifications. As depicted in FIG. 4, as the object at or within cooking appliance is heated from one hundred fifty degrees to three hundred fifty degrees Fahrenheit (150-350° F.) in less than sixty (60) seconds, the heating rate did not exceed threshold T. Accordingly, controller 50 classifies the input (i.e., the voltage input) as a 240V input. If the heating rate did in fact exceed the threshold (i.e., the object at or within cooking appliance heated from one hundred fifty degrees to three hundred fifty degrees Fahrenheit (150-350° F.) slower than sixty (60) seconds), then controller 50 would classify the input as a 208V input.

Figure 5:
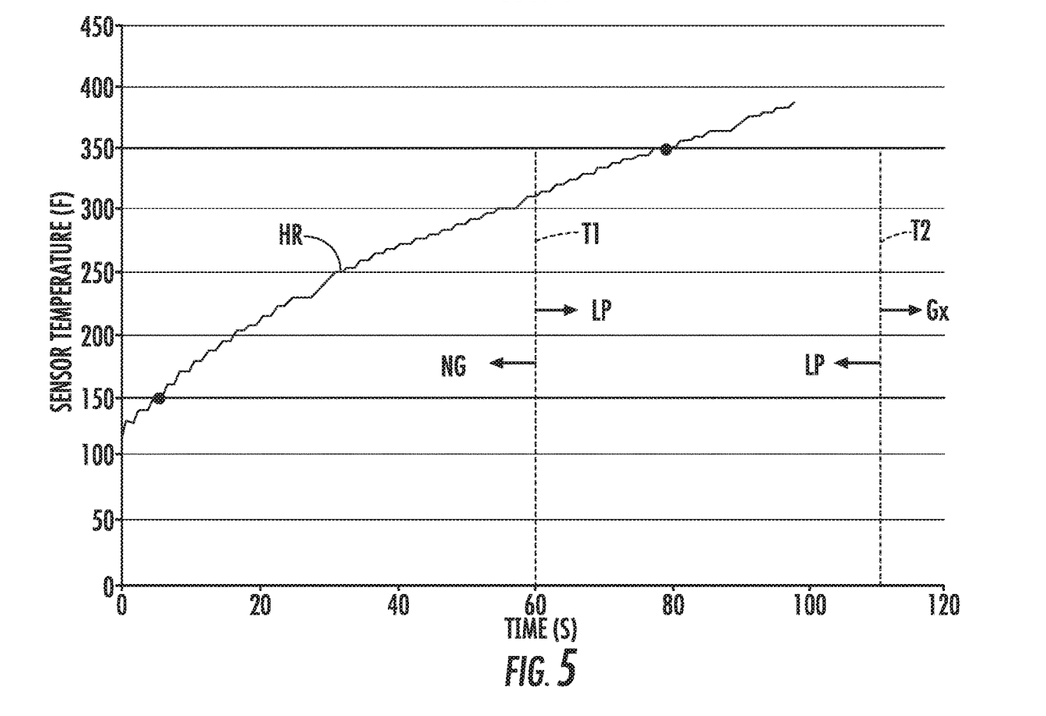
FIG. 5 provides a graph depicting a heating rate of another object at the cooking appliance and depicts the heating rate compared to plurality of thresholds according to example embodiments of the present disclosure.

FIG. 5 provides a graph depicting a heating rate of an object at the cooking appliance according to example embodiments of the present disclosure. For this example, the cooking appliance has a fuel system. Thus, the input is a gas input. The Y-axis of the graph depicts temperature of the object at or within the cooking appliance and the X-axis of the graph depicts time. Moreover, for this example, the predetermined operating range is selected as a range between one hundred fifty degrees and three hundred fifty degrees Fahrenheit (150-350° F.). As shown in FIG. 5, the plurality of signals received from the temperature senor are plotted or tracked as a function of time to determine the heating rate HR of the object at or within the cooking appliance. In this example, classifying the input into one classification of the plurality of classifications based at least in part on the heating rate determined at (308) includes comparing the heating rate to one or more thresholds. The heating rate may be compared to multiple thresholds as shown in FIG. 5. As depicted, a first threshold T1 is set at about sixty (60) seconds for distinguishing between NG and LP and a second threshold T2 is set at about one hundred ten (110) seconds for distinguishing between LP and some suitable gas $G_X$. After the heating rate is determined at (306), the input is classified by comparing the heating rate to the thresholds T1, T2. Particularly, in this example, the heating rate HR may first be compared to the first threshold T1. As the heating rate HR of the object at or within cooking appliance exceeds the first threshold T1, controller 50 may determine that the gas input is not NG, and thus, controller 50 does not classify the input as NG. The heating rate HR may then be compared to the second threshold T2. As the heating rate HR of the object at or within cooking appliance does not exceed the second threshold T2, controller 50 determines that the gas input is in fact LP, and accordingly, controller 50 classifies the input as LP. As will be appreciated, in implementations in which the cooking appliance has an electrical system for generating heat for cooking, the heating rate may likewise be compared to multiple thresholds. For example, the thresholds may distinguish the classifications of 208V, 220V, 230V, and 240V. After the input is classified at (308), one or more settings associated with the classified input may be selected so that optimal cooking performance with cooking appliance may be achieved.

Figure 6:
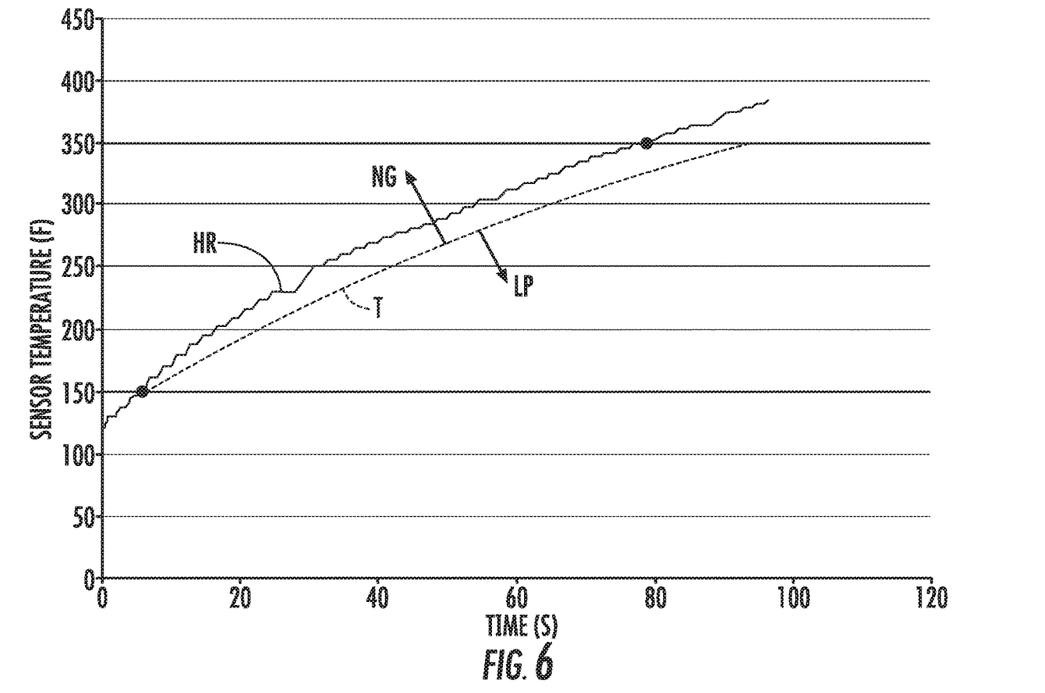
FIG. 6 provides a graph depicting a heating rate of yet another object at the cooking appliance and depicts a slope of the heating rate compared to a threshold according to example embodiments of the present disclosure.

In some implementations, method (300) includes comparing a slope of the heating rate for the predetermined operating range to one or more thresholds. In such implementations, during classifying at (308), the input is classified into one classification of the plurality of classifications based at least in part on the slope of the heating rate for the predetermined operating range. For instance, as shown in FIG. 6, the slope of the heating rate HR for the predetermined operating range, which in this embodiment is from one hundred fifty degrees to three hundred fifty degrees Fahrenheit (150-350° F.), is compared to a threshold T as depicted. In this implementation, the threshold has a predetermined slope. The predetermined slope may be based on a number of parameters, such as e.g., the type of cooking appliance and the type of heating system of the cooking appliance, among other factors. In some implementations, the slope of the heating rate HR may be compared to multiple thresholds. If the slope of the heating rate HR exceeds the threshold T (i.e., if the slope of the heating rate HR is greater than the threshold T), controller 50 may classify the input as NG. On the other hand, if the slope of the heating rate does not exceed the threshold (i.e., if the slope of the heating rate is less than the threshold), controller 50 may classify the input as LP. In this example, the slope of the heating rate HR exceeds the threshold, and thus, controller 50 classifies the input as NG. In some implementations, instead of comparing the slope of the heating rate plotted, the method (300) may include calculating a derivate of the heating rate. In such implementations, during classifying at (308), the input is classified into one classification of the plurality of classifications based at least in part on the derivative of the heating rate. For instance, the derivate of the heating rate may be compared to one or more thresholds in a similar manner as noted above.

Figure 7:
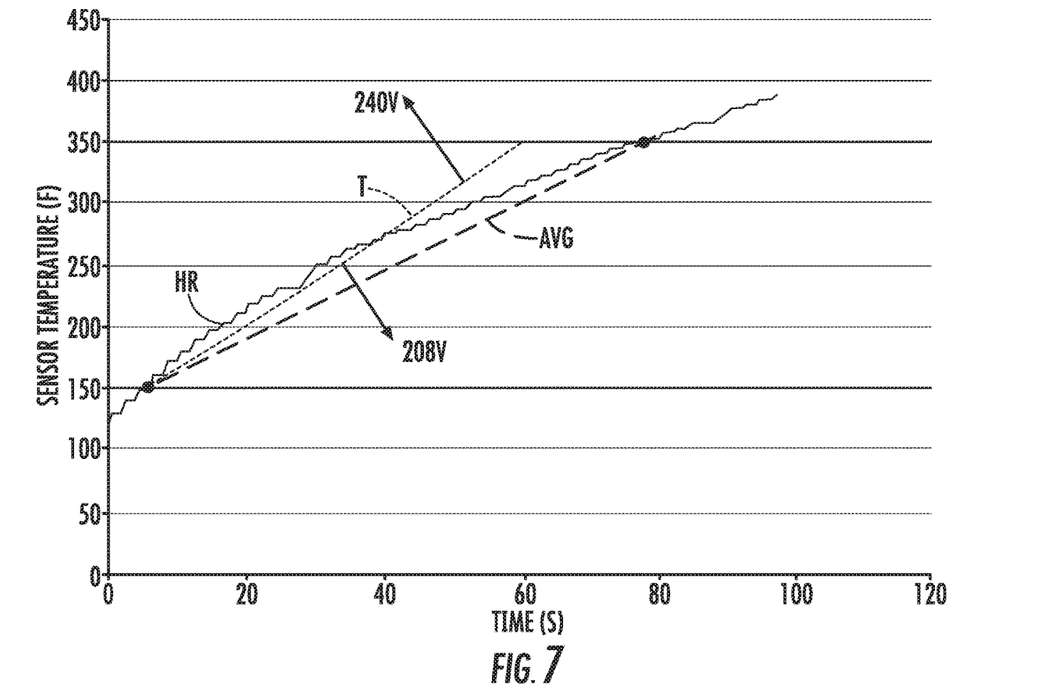
FIG. 7 provides a graph depicting a heating rate of another object at the cooking appliance and depicts an average slope of the heating rate compared to a threshold according to example embodiments of the present disclosure.

In some implementations, method (300) includes calculating an average slope of the heating rate for the predetermined operating range. In such implementations, during classifying at (308), the input is classified into one classification of the plurality of classifications based at least in part on the average heating rate. For instance, as shown in FIG. 7, the average slope, denoted as AVG, of the heating rate HR is calculated for the predetermined operating range, which in this embodiment is from one hundred fifty degrees to three hundred fifty degrees Fahrenheit (150-350° F.). Once the average slope AVG of the heating rate HR is determined, the average slope AVG of the heating rate HR is compared to a threshold T as depicted. The threshold T may be a predetermined threshold. The predetermined threshold may be based on a number of parameters, such as e.g., the type of cooking appliance and the type of heating system of the cooking appliance, among other factors. If the average slope AVG of the heating rate HR exceeds the threshold T (i.e., if the average slope AVG of the heating rate HR is greater than the threshold T), controller 50 may classify the input as a 240V input. On the other hand, if the average slope AVG of the heating rate HR does not exceed the threshold T (i.e., if the average slope AVG of the heating rate HR is less than the threshold T), controller 50 may classify the input as a 208V input. In this example, the average slope AVG of the heating rate HR does not exceed the threshold T, and thus, controller 50 classifies the input as a 208V input.

Figure 8:
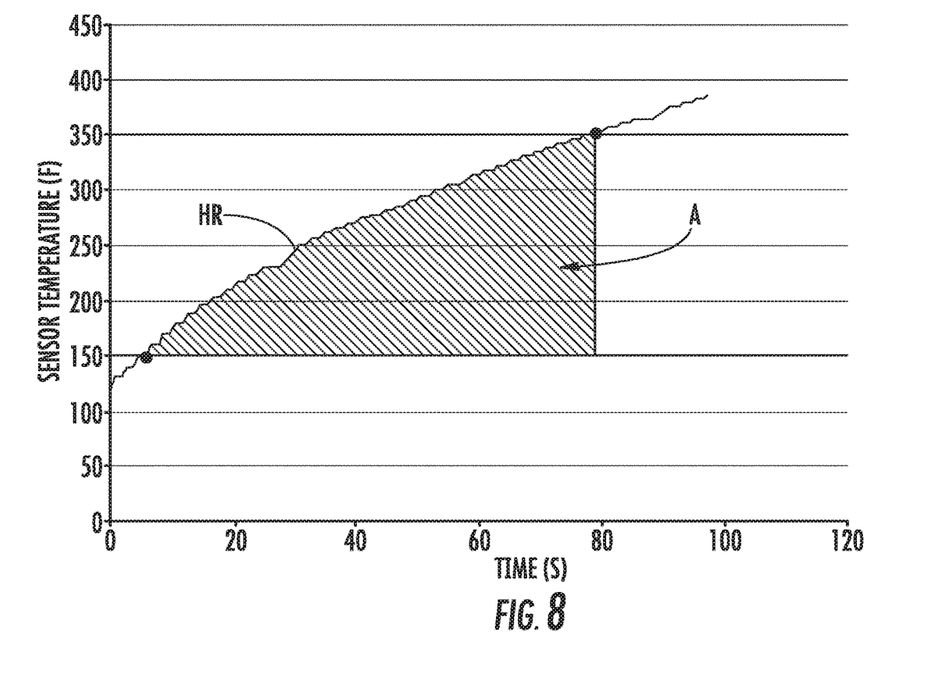
FIG. 8 provides a graph depicting a heating rate of yet another object at the cooking appliance and an integral of the heating rate according to example embodiments of the present disclosure.

In some implementations, method (300) includes calculating an integral of the heating rate. That is, the area under the curve of the heating rate is calculated. In such implementations, during classifying at (308), the input is classified into one classification of the plurality of classifications based at least in part on the integral of the heating rate. For instance, as shown in FIG. 8, the integral of the heating rate may be calculated. The integral of the heating rate is graphically depicted by the shaded area under the heating rate curve in FIG. 8, denoted by "A". Once calculated, the integral may be compared to one or more thresholds, which each may be predetermined areas in such implementations. If the integral of the heating rate exceeds the threshold (i.e., if the calculated area is greater than the predetermined area of a particular threshold), controller 50 may classify the input as a particular gas type or supplied input voltage. On the other hand, if the integral of the heating rate does not exceed the threshold (i.e., if the calculated area is less than the predetermined area of a particular threshold), controller 50 may classify the input as another gas type or supplied input voltage.

In some implementations, the method (300) further includes determining a heating system type of the cooking appliance. For instance, the heating system type may be one of an electrical system and a fuel system. Determining the heating system may take place prior to commencing the calibration cycle at (302) or at some other point in the calibration cycle prior to classifying the input at (308). As one example, an operator may manually input or select the heating system type of the cooking appliance. As another example, an operator may manually enter the model number of the appliance, and based the model number, controller 50 may determine the heating system type. As yet another example, a voltage input supplied to the cooking appliance may be determined, and based on the voltage input, the heating system type may be determined. For instance, if the input voltage to the cooking appliance is 120V, controller 50 may determine that the heating system type is a gas fuel system. If, on the other hand, the input voltage is greater than 120V, the system may determine that the heating system type is an electrical system. Controller 50 may automatically determine the heating system type. Once the heating system type is determined, the method (300) may include setting the threshold(s) based at least in part on the heating system type determined. Moreover, the method may include setting the predetermined operating range as well as other parameters of the calibration cycle in accordance with the heating system type determined. For instance, the heating profile utilized during the calibration cycle may be selected based on the determined heating system type. In this way, the input into the cooking appliance may be classified more accurately, which ultimately leads to selection of settings for optimal cooking performance.

Further, in some implementations, the plurality of signals indicative of the temperature of the object or air at or within the cooking appliance are received from a sensor, such as e.g., temperature sensor 100 or 102 of FIG. 2. In such implementations, during setting the threshold, the threshold is set based at least in part on a location of the sensor. As one example, the temperature sensor sensing the temperature of the object or air at or within the cooking appliance may report its position to controller 50. As another example, controller 50 may determine the location of the sensor via a locating sequence. As yet a further example, the temperature sensor may be in a fixed and known position. For instance, the temperature sensor 100 may be fixed in position to rear wall 38 (FIG. 2). Notably, the location of the sensor may affect the heating rate, and thus, knowing the location of the sensor used to take the temperature readings may allow for more accurate classifications of the input, which as noted above, may ultimately lead to selection of optimal cooking settings and thus better cooking performance.

At (310), returning to FIG. 3, the method (300) includes selecting one or more settings of the cooking appliance based at least in part on the classification of the input. For instance, each classification may have an associated setting that provides optimal performance of the cooking appliance. The one or more settings may be selected automatically by controller 50, e.g., after controller 50 has classified the input at (308) (i.e., determined the fuel or gas type or the supplied input voltage into the cooking appliance). The selection of the one or more settings may change the heating profile of the system and cycle parameters and thus the cooking appliance may be configured for optimal cooking performance.

Figure 9:
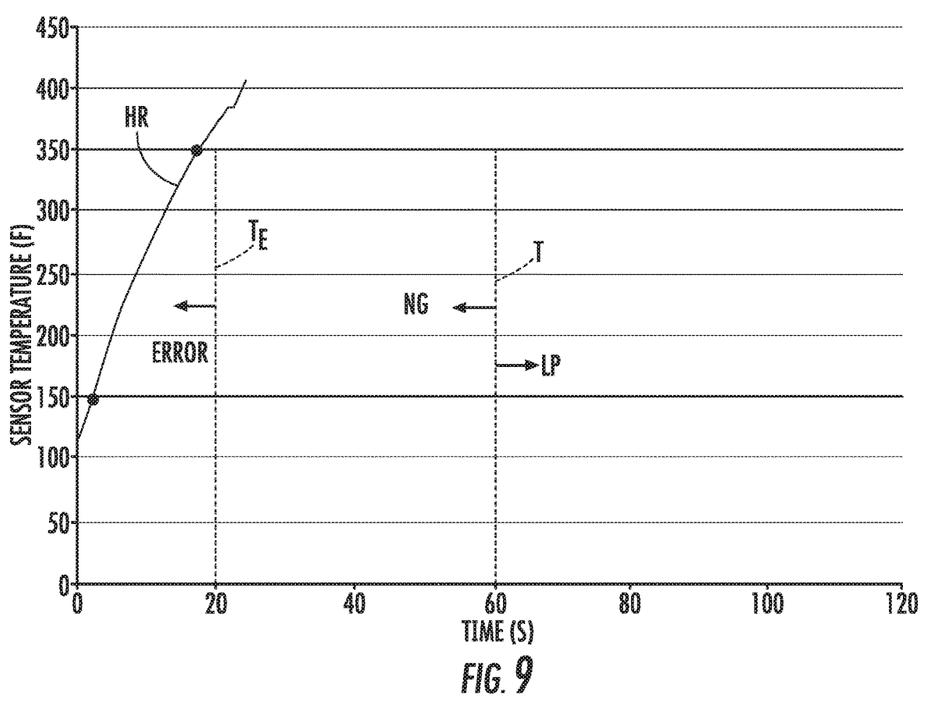
FIG. 9 provides a graph depicting a heating rate of another object at the cooking appliance according to example embodiments of the present disclosure.

Referring now to FIG. 9, in some implementations, the heating system type of the cooking appliance is a fuel system, and thus the input is a gas input. In such implementations, classifying the input into one classification of the plurality of classifications based at least in part on the heating rate determined includes determining whether the heating rate exceeds an error threshold. As shown in FIG. 9, an error threshold $T_E$ is set at about twenty (20) seconds from the point in time in which the object or air at or within cooking appliance reaches one hundred fifty degrees Fahrenheit (150° F.) and a threshold distinguishing the NG and LP classifications is set at about sixty (60) seconds. In the example of FIG. 9, the heating rate HR exceeds the error threshold $T_E$. That is, in this example, the object at or within cooking appliance was heated from one hundred fifty degrees to three hundred fifty degrees Fahrenheit (150-350° F.) in less than twenty (20) seconds, and accordingly, the heating rate HR exceeds the error threshold $T_E$. Accordingly, controller 50 classifies the input as an error. In such implementations, if the heating rate exceeds the error threshold, the method (300) includes communicating an alert that the heating rate has exceeded the error threshold. For instance, an alert may be sent to an operator's computing device or electronic device. Alternatively, the alert may appear on display 55 (FIG. 1).

As one example, the heating rate may exceed the error threshold as shown in FIG. 9 in instances in which LP is the input but yet the fuel system of the cooking appliance is configured for NG. For instance, for NG fuel systems, a metering device that meters the gas to the gas burner may define an orifice. The orifice for a metering device of an NG fuel system is typically larger than an orifice of a metering device for an LP fuel system. Thus, when an NG metering device is used for an LP input, the heating rate of the object or air at or within the cooking appliance may be excessively rapid for most cooking operations, and thus, the heating rate may exceed the error threshold. However, as noted above, controller 50 may be configured to detect such an error and communicate an alert to an operator. In this manner, the operator may be alerted of the excessive heating rate during the calibration cycle and may take corrective action, e.g., by switching the metering device of the fuel system.

The method and cooking appliance described herein provide a number of benefits and advantages. For instance, the method and cooking appliance herein provide for an automatic determination of the fuel type or line voltage input into the cooking appliance. Stated differently, there is no need for an operator to manually select the gas type or line voltage input into the cooking appliance. This may reduce user error and quicken the installation process. Further, the method described herein may be executed by software running on a controller of the appliance and no additional circuitry or components are needed for determining the fuel type or line voltage input. Moreover, cooking appliances typically include a temperature sensor, and such temperature sensors may be utilized for the calibration cycle. Further, the method of the present disclosure is applicable to cooking appliances having electrical systems, fuel systems, or both. Thus, separate techniques and software need not be learned or programmed for fuel systems and electrical systems. Moreover, the cooking appliance and method of the present disclosure provide a technique for alerting operators when hardware configurations are incompatible with the gas type input into the cooking appliance. The cooking appliance and method of the present disclosure may have other benefits and advantages not explicitly noted herein.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A method for calibrating a cooking appliance, the method comprising:
   providing an input to a heating element of the cooking appliance to generate heat at or within the cooking appliance;
   receiving a plurality of signals indicative of a temperature of an object or air at or within the cooking appliance;
   determining a heating rate of the object or air at or within the cooking appliance for a predetermined operating range based at least in part on the plurality of signals;
   classifying the input into one classification of a plurality of classifications based at least in part on the heating rate determined; and
   selecting one or more settings of the cooking appliance based at least in part on the classification of the input.

2. The method of claim 1, wherein classifying the input into one classification of the plurality of classifications based at least in part on the heating rate determined comprises determining whether the heating rate exceeds a threshold.

3. The method of claim 2, further comprising:
   determining a heating system type of the cooking appliance, wherein the heating system type is one of an electrical system and a fuel system; and
   setting the threshold based at least in part on the heating system type determined.

4. The method of claim 3, wherein the plurality of signals indicative of the temperature of the object or air at or within the cooking appliance are received from a sensor, and wherein during setting the threshold, the threshold is set based at least in part on a location of the sensor.

5. The method of claim 1, wherein classifying the input into one classification of the plurality of classifications based at least in part on the heating rate determined comprises comparing the heating rate to one or more thresholds.

6. The method of claim 1, wherein the heating rate is indicative of a change in the temperature of the object or air at or within the cooking appliance over time for the predetermined operating range.

7. The method of claim 1, wherein the input is a gas input and the plurality of classifications are representative of gas types.

8. The method of claim 1, wherein the input is a voltage input and the plurality of classifications are representative of line voltage values.

9. The method of claim 1, further comprising:
   calculating an average heating rate of the heating rate for the predetermined operating range, and wherein during classifying, the input is classified into one classification of the plurality of classifications based at least in part on the average heating rate for the predetermined operating range.

10. The method of claim 1, further comprising:
    calculating a derivate of the heating rate, and wherein during classifying, the input is classified into one classification of the plurality of classifications based at least in part on the derivative of the heating rate.

11. The method of claim 1, further comprising:
    calculating an integral of the heating rate, and wherein during classifying, the input is classified into one classification of the plurality of classifications based at least in part on the integral of the heating rate.

12. The method of claim 1, wherein classifying the input is classified into one classification of the plurality of classifications comprises comparing a slope of the heating rate for the predetermined operating range to one or more thresholds.

13. The method of claim 1, wherein the input is a gas input, and wherein classifying the input into one classification of the plurality of classifications based at least in part on the heating rate determined comprises determining whether the heating rate exceeds an error threshold, and wherein when the heating rate exceeds the error threshold, the method further comprises:
    communicating an alert that the heating rate exceeds the error threshold.

* * * * *